United States Patent
Kubota et al.

(10) Patent No.: US 8,293,405 B2
(45) Date of Patent: Oct. 23, 2012

(54) RECHARGEABLE LITHIUM ION BATTERY AND METHOD FOR PRODUCING THE SAME

(75) Inventors: Kazunori Kubota, Osaka (JP); Yasuhiro Ueyama, Osaka (JP)

(73) Assignee: Panasonic Corporation, Osaka (JP)

( * ) Notice: Subject to any disclaimer, the term of this patent is extended or adjusted under 35 U.S.C. 154(b) by 636 days.

(21) Appl. No.: 12/122,803

(22) Filed: May 19, 2008

(65) Prior Publication Data
US 2008/0292965 A1    Nov. 27, 2008

(30) Foreign Application Priority Data

May 21, 2007 (JP) ................. 2007-133711
Mar. 28, 2008 (JP) ................. 2008-087551

(51) Int. Cl.
*H01M 4/02* (2006.01)
*H01M 4/13* (2010.01)
*H01M 4/60* (2006.01)

(52) U.S. Cl. ........... 429/215; 429/209; 429/212; 427/58

(58) Field of Classification Search ................. 429/246, 429/209, 212, 215; 427/58
See application file for complete search history.

(56) References Cited

U.S. PATENT DOCUMENTS

| | | |
|---|---|---|
| 5,474,863 A | 12/1995 | Yamamoto |
| 5,702,845 A | 12/1997 | Kawakami et al. |
| 6,156,453 A | 12/2000 | Shimizu et al. |
| 6,447,958 B1 | 9/2002 | Shinohara et al. |
| 6,756,153 B1 | 6/2004 | Yamamoto et al. |
| 6,824,925 B2 | 11/2004 | Muraoka et al. |
| 7,052,629 B2 | 5/2006 | Maeda et al. |
| 2003/0022066 A1 | 1/2003 | Muraoka et al. |
| 2003/0113626 A1 | 6/2003 | Maeda et al. |
| 2005/0198815 A1* | 9/2005 | Suzuki et al. ............. 29/623.5 |
| 2006/0058462 A1 | 3/2006 | Kim et al. |
| 2006/0257739 A1* | 11/2006 | Ryu et al. ................. 429/217 |

FOREIGN PATENT DOCUMENTS

| | | | |
|---|---|---|---|
| JP | 50033424 A | * | 3/1975 |
| JP | 08-250124 | | 9/1996 |
| JP | 08-321300 | | 12/1996 |
| JP | 2000030686 | | 1/2000 |
| JP | 2001185152 | | 7/2001 |

(Continued)

OTHER PUBLICATIONS

Machine translation of JP 2005228642 A, Nishida, Aug. 2005.*
Machine translation of JP 2002270178, Nakamura et al., Sep. 2002.*
Abstract of JP 50033424 A, Fuji Electrochemical Co. Ltd., Mar. 1975.*

(Continued)

*Primary Examiner* — Basia Ridley
*Assistant Examiner* — Sean P Cullen
(74) *Attorney, Agent, or Firm* — Greenblum & Bernstein, P.L.C.

(57) ABSTRACT

The present invention relates to a rechargeable lithium ion battery having an electrode plate with a high active material density and high electrolyte permeability. Upon producing the rechargeable lithium ion battery, hollow resin particles that can be collapsed by rolling are incorporated in a positive electrode mixture layer or a negative electrode mixture layer before the electrode mixture layer is rolled. The hollow resin particles are collapsed in the course of rolling the positive electrode mixture layer or the negative electrode mixture layer, so that the active material density can be easily increased. Further, the collapsed resin particles form unevenness on the surface of the electrode plate and also form open pores in the electrode plate, so that electrolyte permeability can be enhanced. As a result, the discharge capacity and rate characteristics of rechargeable lithium ion batteries can be increased.

7 Claims, 4 Drawing Sheets

FOREIGN PATENT DOCUMENTS

| | | | |
|---|---|---|---|
| JP | 2002198043 | | 7/2002 |
| JP | 2002270178 A | * | 9/2002 |
| JP | 2003092111 | | 3/2003 |
| JP | 2003-168438 | | 6/2003 |
| JP | 2005228642 A | * | 8/2005 |
| JP | 2008004302 A | * | 1/2008 |
| JP | 2008021444 A | * | 1/2008 |

OTHER PUBLICATIONS

Kaneda et al., Machine translation of JP 2008-004302 A, Jan. 2008.*

Ariga et al., Machine translation of JP 2008-021444 A, Jan. 2008.*

English Language Abstract of JP 2003168438, Jun. 13, 2003.

English Language Abstract of JP 2001185152, Jul. 6, 2001.

English Language Abstract of JP 2000030686, Jan. 28, 2000.

English Language Abstract of JP08-321300, Dec. 3, 1996.

English Language Abstract of JP 2002198043, Jul. 12, 2002.

English Language Abstract of JP 2003092111, Mar. 28, 2003.

English Language Abstract of JP 08-250124, Sep. 27, 1996.

* cited by examiner

RECHARGEABLE LITHIUM ION BATTERY AND METHOD FOR PRODUCING THE SAME

CROSS REFERENCE TO RELATED APPLICATIONS

The disclosures of Japanese Patent Application No. 2007-133711 filed on May 21, 2007, and Japanese Patent Application No. 2008-087551 filed on Mar. 28, 2008, including the specifications, drawings and abstracts are incorporated herein by reference in their entirety.

FIELD OF THE INVENTION

The present invention relates to a rechargeable lithium ion battery and a method for producing the same.

BACKGROUND OF THE INVENTION

In recent years, rechargeable lithium ion batteries have been greatly expected in the industry for use in mobile applications because of its performance providing high capacity and high energy density. These batteries are composed of a positive electrode plate, a negative electrode plate, and a separator (such as an insulating porous polymer film) disposed between the positive electrode plate and the negative electrode plate.

In general, the positive electrode plate and the negative electrode plate are formed by coating and drying on a current collector a paint prepared by mixing an active material (a positive electrode active material or a negative electrode active material), an electrical conduction enhancer, a binder, and a solvent. On this occasion, for the purpose of increasing the discharge capacity of the rechargeable lithium ion battery, these electrode plates (positive electrode plate and negative electrode plate) are generally rolled to increase the active material density (weight of active material contained in electrode plate per unit volume of the plate). As the active material density increases in the electrode plate, the capacity of the rechargeable lithium ion battery increases.

The rechargeable lithium ion battery has a problem of lowering its cycle life due to buckling of the electrode plates that is caused by repeated expansion and shrinking of the active material in the course of charging and discharging. In order to address this problem, there is disclosed an art of incorporating resin particles in the electrode plates (refer to, for example, Japanese Patent Laid-Open Publication No. 2003-168438 and Japanese Patent Laid-Open Publication No. 2001-185152). In the art disclosed in Japanese Patent Laid-Open Publication No. 2003-168438, the resin particles function as a lubricating agent and allow the active material to move so as to absorb the expansion thereof, thereby preventing the buckling of the electrode plate. Further, in the art disclosed in Japanese Patent Laid-Open Publication No. 2001-185152, an elastic structure having a hollow part functions as a cushion material and can prevent the buckling of the electrode.

Furthermore, for the purpose of increasing the rate characteristics of the rechargeable lithium ion battery and preventing the growth of lithium dendrites that cause internal short circuit, there is disclosed an art (refer to, for example, Japanese Patent No. 3581474) of using an active material formed in the shape of a hollow particle and filling therein an electrical conduction enhancer. By filling the electrical conduction enhancer in the active material having such a hollow structure mentioned above, the conductivity can be increased and the rate characteristics can be enhanced. In addition, in the case where the active material contained in the negative electrode plate is in the form of a porous hollow particle made of carbon or a metal oxide, lithium that deposits on charging does not come into direct contact with an electrolyte solution, thereby preventing the dendritic growth of lithium.

In the rechargeable lithium ion batteries, in order to address problems caused by high capacity and high energy density, for example, temperature elevation due to internal short circuit of the battery, various kinds of countermeasures have been undertaken to improve the separator. As a characteristic requested for the separator, there may be mentioned shutdown characteristics and a resistance against short circuit. "Shutdown" means that a porous polymer film (separator) is fused and the pores of the film are closed so as to shutdown current when the battery temperature is elevated by troubles such as over-charging or short circuit inside or outside of the battery. "Short circuit" means that the temperature of the shutdown battery is further elevated and the separator is fully fused, resulting in opening of a hole or the separator is shrunk so that the positive electrode plate comes into direct contact with the negative electrode plate. When such short circuit occurs, a large current is passed across the positive electrode plate and the negative electrode plate, so that the battery is heated.

As describe above, in the rechargeable lithium ion batteries, it is important that both shutdown characteristics and resistance against short circuit be satisfied. As an art that satisfies both of these, there is disclosed an art that provides heat resistance by using a heat resisting nitrogen-containing aromatic polymer and ceramic powder, and prevents thermal runaway by incorporating a thermoplastic resin that melts at 260° C. or lower (refer to, for example, Japanese Patent Laid-Open Publication No. 2000-030686).

Further, for the purpose of attaining high current discharging without lowering capacity, there is disclosed an art of incorporating in a positive electrode hollow particles capable of holding an electrolyte solution, although the art relates to a rechargeable nickel metal hydride battery (refer to, for example, Japanese Patent Laid-Open Publication No. 2002-198043). In this way, by incorporating the hollow particles in the positive electrode, the electrode area can be increased without reducing the volume of the electrolyte solution, thereby attaining a high current discharging without lowering capacity.

SUMMARY OF THE INVENTION

However, in the art disclosed in Japanese Patent Laid-Open Publication Nos. 2003-168438 and 2001-185152 wherein particles that do not change their volume by rolling are incorporated in an electrode plate, the particles repel each other during rolling the plate, so that the active material density cannot be increased by the rolling. Thus, there was a problem that it was not possible to increase the capacity of rechargeable lithium ion batteries.

Further, even in the art disclosed in Japanese Patent No. 3581474 wherein an active material with a hollow structure was used, it was not possible to increase the active material density. Thus, there was a problem that it was not possible to increase the capacity of rechargeable lithium ion batteries.

Furthermore, these arts had also such a problem that, when the pressure was increased upon rolling in order to increase the active material density, permeability of the electrolyte solution became lowered because of the decrease in the number of pores in the electrode plate, thus lowering the rate characteristics.

It is an object of the present invention to provide a rechargeable lithium ion battery having an electrode plate with high active material density and a high permeability of an electrolyte solution, and a method for producing the battery.

The present inventors have found that the above problems can be solved by incorporating into a positive electrode mixture layer or a negative electrode mixture layer, prior to rolling, hollow resin particles that can be collapsed by rolling in the production of rechargeable lithium ion batteries. The present invention has been accomplished based on this finding and further studies.

Namely, the present invention firstly relates to the following rechargeable lithium ion battery.

(1) A rechargeable lithium ion battery composed of a positive electrode having a positive electrode mixture layer, a negative electrode having a negative electrode mixture layer, and a separator disposed between the positive electrode and the negative electrode. The positive electrode mixture layer or the negative electrode mixture layer contains resin particles. When a scanning electron microscope image of the surface of the positive electrode mixture layer or the negative electrode mixture layer containing the resin particles is reduced to a 256 gray-scale image and then is binarized into black pixels and white pixels at a threshold of 70, a ratio of the total area of the black pixels to the total area of entire pixels is 10% or more and 20% or less.

(2) The rechargeable lithium ion battery as described in (1), wherein the resin particles are contained in the positive electrode mixture layer in an amount of 1 part by weight or more and 20 parts by weight or less with respect to 100 parts by weight of the positive electrode active material.

(3) The rechargeable lithium ion battery as described in (1) or (2), wherein the resin particles are contained in the negative electrode mixture layer in an amount of 1 part by weight or more and 50 parts by weight or less with respect to 100 parts by weight of the negative electrode active material.

(4) The rechargeable lithium ion battery as described in any of (1) to (3), wherein the resin particles are contained in the positive electrode mixture layer or the negative electrode mixture layer at a resin particle density of 1 g/cm$^3$ or more and 20 g/cm$^3$ or less.

In addition, the present invention secondly relates to the following method for producing a rechargeable lithium ion battery.

(5) A method for producing a rechargeable lithium ion battery includes the following steps of:

forming a positive electrode having a positive electrode mixture layer and a positive electrode current collector by coating a positive electrode paint containing a positive electrode active material at a positive electrode active material density on the positive electrode current collector;

forming a negative electrode having a negative electrode mixture layer and a negative electrode current collector by coating a negative electrode paint containing a negative electrode active material at a negative electrode active material density on the negative electrode current collector;

increasing the positive electrode active material density in the positive electrode mixture layer by rolling the positive electrode;

increasing the negative electrode active material density in the negative electrode mixture layer by rolling the negative electrode; and stacking in layers the positive electrode after rolling, a separator, and the negative electrode after rolling, wherein the positive electrode paint or the negative electrode paint further contains hollow resin particles.

(6) The method for producing a rechargeable lithium ion battery as described in (5), wherein the hollow resin particles are contained in the positive electrode paint in an amount of 1 part by weight or more and 20 parts by weight or less with respect to 100 parts by weight of the positive electrode active material.

(7) The method for producing a rechargeable lithium ion battery as described in (5) or (6), wherein the hollow resin particles are contained in the negative electrode paint in an amount of 1 part by weight or more and 50 parts by weight or less with respect to 100 parts by weight of the negative electrode active material.

(8) The method for producing a rechargeable lithium ion battery as described in any of (5) to (7), wherein the hollow resin particles are contained in the positive electrode mixture layer or the negative electrode mixture layer after rolling at a resin particle density of 1 g/cm$^3$ or more and 20 g/cm$^3$ or less.

(9) The method for producing a rechargeable lithium ion battery as described in any of (5) to (8), wherein an average diameter of the hollow resin particles contained in the positive electrode paint is 0.1 μm or more and 10 μm or less.

(10) The method for producing a rechargeable lithium ion battery as described in any of (5) to (9), wherein an average diameter of the hollow resin particles contained in the negative electrode paint is 0.1 μm or more and 20 μm or less.

(11) The method for producing a rechargeable lithium ion battery as described in any of (5) to (10) wherein the volume percentage of the hollow part in the hollow resin particle is 20% or more and 80% or less.

According to the present invention, the hollow resin particles are collapsed upon rolling the positive electrode plate or the negative electrode plate, so that the active material density can be easily increased, enabling the increase in the capacity of rechargeable lithium ion batteries. In addition, according to the present invention, the collapsed resin particles form unevenness on the surface of the electrode plate and also form pores within the electrode plate, so that permeability of the electrolyte solution can be enhanced, enabling the increase in the rate characteristics of rechargeable lithium ion batteries.

BRIEF DESCRIPTION OF THE DRAWINGS

FIG. 1 is a cross-sectional view illustrating an exemplary embodiment of a rechargeable lithium ion battery according to the present invention.

FIG. 2 is a schematic view illustrating a production process of a positive electrode in the production method according to the present invention.

FIG. 3 is a schematic view illustrating a production process of a negative electrode in the production method according to the present invention.

FIG. 4 is a picture showing the results of Embodiment 13.

DETAILED DESCRIPTION OF THE PREFERRED EMBODIMENT

1. Rechargeable Lithium Ion Battery of the Present Invention

The rechargeable lithium ion battery of the present invention is composed of a positive electrode (positive electrode plate) having a positive electrode mixture layer, a negative electrode (negative electrode plate) having a negative electrode mixture layer, and a separator that is disposed between the positive electrode and the negative electrode, and is characterized in that at least one of the positive electrode mixture layer and the negative electrode mixture layer contains resin particles. The rechargeable lithium ion battery of the present invention is also characterized in that permeability of the electrolyte solution in the mixture layer is high because a number of pores are formed in the mixture layer that contains the resin particles.

In the present specification, "active material density" refers to weight of active material contained in mixture layer per unit volume of the mixture layer, and "resin particle density" refers to weight of resin particles contained in mixture layer per unit volume of the mixture layer.

Figure 1A:
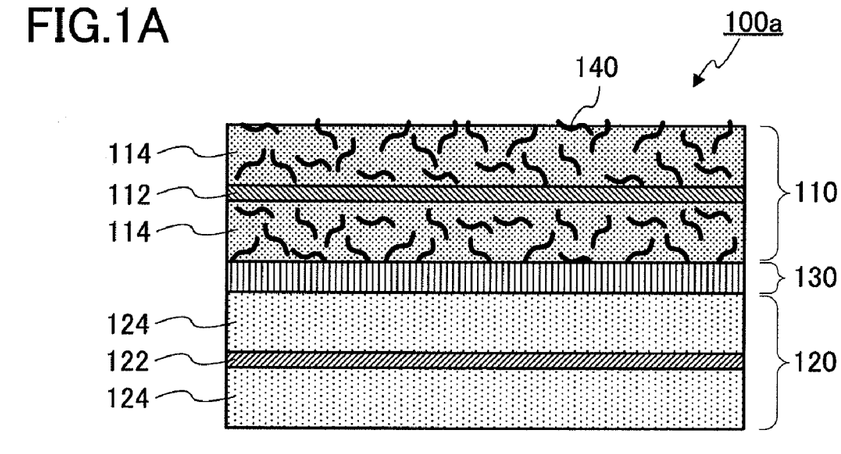
FIG. 1A shows an embodiment where only a positive electrode mixture layer contains resin particles.
Figure 1B:
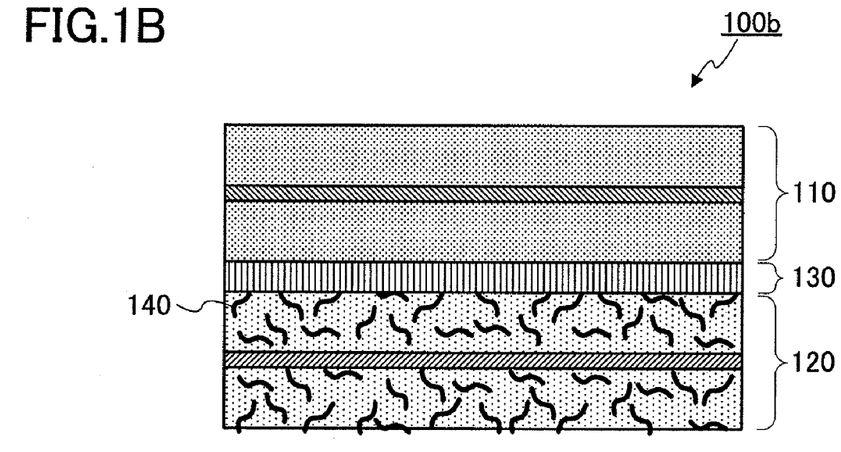
FIG. 1B shows an embodiment where only a negative electrode mixture layer contains resin particles.
Figure 1C:
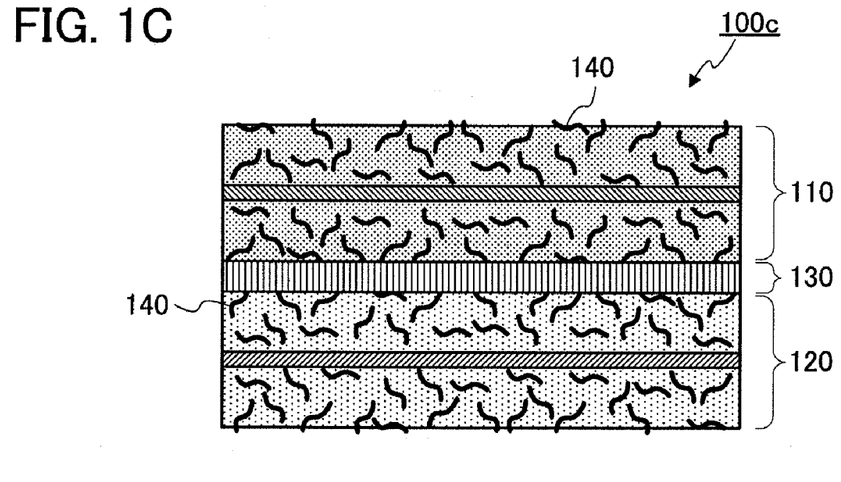
FIG. 1C shows an embodiment where both positive electrode mixture layer and negative electrode mixture layer contain resin particles.

FIG. 1 is a cross-sectional view illustrating an embodiment of a rechargeable lithium ion battery according to the present invention. As shown in FIGS. 1A to 1C, a rechargeable lithium ion battery 100 according to the present invention is composed of a positive electrode 110 having a positive electrode current collector 112 and a positive electrode mixture layer 114, a negative electrode 120 having a negative electrode current collector 122 and a negative electrode mixture layer 124, and a separator 130 that is disposed between the positive electrode 110 and the negative electrode 120. At least one of the positive electrode mixture layer 114 and the negative electrode mixture layer 124 contains resin particles 140. FIG. 1A shows an embodiment where only the positive electrode mixture layer 114 contains the resin particles 140. FIG. 1B shows an embodiment where only the negative electrode mixture layer contains the resin particles 140. FIG. 1C shows an embodiment where both positive electrode mixture layer 114 and negative electrode mixture layer 124 contain the resin particles 140.

The positive electrode is composed of a positive electrode current collector and a positive electrode mixture layer that is formed on the positive electrode current collector. Similarly, the negative electrode is composed of a negative electrode current collector and a negative electrode mixture layer that is formed on the negative electrode current collector. In the positive and negative electrodes, each mixture layer may be formed on one side or both sides of each current collector.

The positive electrode current collector and the negative electrode current collector serve as an electrode base that holds the positive electrode mixture layer or the negative electrode mixture layer, and has a function of collecting current. Examples of the positive electrode current collector and the negative electrode current collector include metal foil such as aluminum foil, copper foil, and nickel foil, a laminate of a polymer film such as PET that has vacuum-deposited metal on its surface, an electrically conductive polymer film, and the like, but are not limited to them as long as it has high electrical conductivity.

The positive electrode mixture layer and the negative electrode mixture layer are formed by binding a positive electrode active material or a negative electrode active material with a binder. The binder binds together a current collector and an active material and also binds together active materials. Optionally the positive electrode mixture layer and the negative electrode mixture layer may contain other materials such as an electrical conduction enhancer.

Examples of the positive electrode active material include a lithium transition metal oxide such as lithium cobaltate, lithium nickelate, and lithium manganate; a transition metal sulfide such as FeS and $TiS_2$; an organic compound such as polyaniline and polypyrrole; a compound that is given by partial elemental substitution of the foregoing compounds; and the like, but are not limited to them as long as they are capable of absorbing and releasing lithium ions.

Examples of the negative electrode active material include a carbonaceous active material such as graphite and coke; metallic lithium; a lithium transition metal nitride; silicon; and the like, but are not limited to them as long as they are capable of absorbing and releasing lithium ions.

Examples of the binder include a fluororesin such as poly (vinylidene fluoride) and polytetrafluoroethylene; a fluororubber such as a copolymer of vinylidene fluoride, hexafluoropropylene and tetrafluoroethylene; a latex such as styrene-butadiene copolymer latex and acrylonitrile-butadiene copolymer latex; a cellulose derivative such as carboxymethylcellulose; and the like, but are not limited to them.

Examples of the electrical conduction enhancer include carbon powder such as acetylene black, carbon black, and graphite; and the like, but are not limited to them.

As mentioned above, the rechargeable lithium ion battery of the present invention is characterized in that at least one of the positive electrode mixture layer and the negative electrode mixture layer contains resin particles.

Examples of the resin particles include polyethylene, polypropylene, acryl, fluororesin, cellulose derivative, and the like, but are not limited to them. And the shape and size of the resin particles are not particularly limited.

The amount of the resin particles is preferably 1 part by weight or more and 20 parts by weight or less with respect to 100 parts by weight of the positive active material in the positive electrode mixture layer, and in the negative electrode mixture layer preferably 1 part by weight or more and 50 parts by weight or less with respect to 100 parts by weight of the negative electrode active material. In terms of the resin particle density (weight of resin particles contained in mixture layer per unit volume of the mixture layer), either mixture layer contains the resin particles at a resin particle density of preferably 1 $g/cm^3$ or more and 20 $g/cm^3$ or less. When the amount of the resin particles is too low, the effect of improving rate characteristics (described later) is not expected. On the other hand, when the amount of the resin particles is too high, discharge capacity is lowered because the amount of the active material becomes small in the mixture layer.

When the rechargeable lithium ion battery of the present invention is produced by the production method according to the present invention described later, hollow resin particles collapsed by rolling make the above resin particles.

Examples of the separator that is disposed between the positive and negative electrodes include an insulating porous polymer film, and the like, but are not limited to them as long as the positive and negative electrodes are insulated therewith and lithium ions can penetrate into a material composing the separator or through voids formed in the separator. The separator may be formed by coating, drying and rolling a mixture composed of inorganic particles, organic particles, a mixture thereof, binder, solvent, and various kinds of additives. Examples of the inorganic particles include alumina, silica, magnesium oxide, titanium oxide, zirconia, silicon carbide, silicon nitride, and the like. Examples of the organic particles include polyethylene, polypropylene, polystyrene, polyacrylonitrile, polymethylmethacrylate, poly(vinylidene fluoride), polytetrafluoroethylene, polyimide, and the like.

The positive and negative electrodes and separator preferably hold an electrolyte solution therein. For example, the positive and negative electrodes and separator are allowed to be disposed in the electrolyte solution, so that the electrolyte solution can be held in the positive and negative electrodes and separator. Specifically, a power generation element that is given by disposing the separator between the positive and negative electrodes is inserted in a stainless case; and then the electrolyte solution is injected into the stainless case, so that the electrolyte solution can be held in the positive and negative electrodes and separator.

Examples of a non-aqueous solvent that is used for the electrolyte solution include ethylene carbonate, propylene carbonate, butylene carbonate, dimethyl carbonate, diethyl carbonate, γ-butyrolactone, sulfolane, acetonitrile, 1,2-dimethoxyethane, 1,3-dimethoxypropane, diethylether, tetrahydrofuran, 2-methyltetrahydrofuran, and the like, but are not limited to them. The non-aqueous solvent may be used singly or in a combination of two or more kinds.

Examples of the electrolyte include a lithium salt such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$) lithium bistrifluoromethylsulfonylimide ($LiN(CF_3SO_2)_2$), and the like, but are not limited to them.

As mentioned above, the rechargeable lithium ion battery of the present invention is also characterized in that the mixture layer containing the resin particles has a number of pores. These pores connect to the outside of the mixture layer, so that the rechargeable lithium ion battery of the present invention is characterized by having a large surface pore area in the mixture layer that contains the resin particles.

The surface pore area of the mixture layer can be evaluated by binarization of a scanning electron microscope image (hereinafter, refer to as "SEM image") of the mixture layer surface.

An example of the binarization may include the fixed threshold treatment, the variable threshold treatment, the adaptive binarization, the constant variance enhancement processing, and the like. These methods are explained in, for example, page 63 to 67 of "Degitaru Gazo Shori Nyumon" published by CQ Publishing Co., Ltd., page 111 to 117 of "Kagaku Keisoku No Tameno Gazo Deta Shori" published by CQ Publishing Co., Ltd., and others.

For example, when the fixed threshold treatment is applied, an SEM image of a mixture layer surface is reduced to a 256 gray-scale image (0 to 255) and may be binarized at a threshold of 70 (0 to 69 are reduced to 0 (black), and 70 to 255 are reduced to 255 (white)). In this treatment, the area of black pixels corresponds to the open-pores. The surface pore area of the mixture layer can be evaluated by calculating the ratio of the area of black pixels to the area of entire pixels of the binarized image. When a threshold of 70 is selected as described above, the surface pore area of a mixture layer that contains the resin particles of the rechargeable lithium ion battery according to the present invention becomes 10% or more and 20% or less (refer to Embodiments).

A mixture layer having a large number of open-pores therein has high permeability of the electrolyte solution and a high contact area between active material and electrolyte solution, so that the rechargeable lithium ion battery of the present invention exhibits excellent rate characteristics as compared with conventional rechargeable lithium ion batteries.

The rechargeable lithium ion battery of the present invention can be produced by, for example, the production method according to the present invention mentioned below.

When the rechargeable lithium ion battery of the present invention is produced by the production method according to the present invention, the mixture layer that contains the resin particles is made to have a higher active material density as compared with the mixture layer of conventional batteries. Therefore, by being produced by the production method according to the present invention, the rechargeable lithium ion battery of the present invention can attain a higher capacity as compared with conventional rechargeable lithium ion batteries.

2. Method for Producing a Rechargeable Lithium Ion Battery of the Present Invention The method for producing a rechargeable lithium ion battery according to the present invention includes a positive electrode coating step; a negative electrode coating step; a positive electrode rolling step; a negative electrode rolling step; and a stacking step, and is characterized in that hollow resin particles are incorporated in a positive electrode paint or a negative electrode paint using in the coating step (the positive electrode coating step or the negative electrode coating step).

Coating Step

In the positive electrode coating step, the positive electrode paint is coated on a positive electrode current collector, so that a positive electrode composed of a positive electrode mixture layer and the positive electrode current collector is formed.

The positive electrode current collector, as mentioned above, is not particularly limited as long as it has a high electrical conductivity, and is aluminum foil or the like, for example.

The positive electrode paint contains a solvent, a positive electrode active material and a binder that are dissolved or dispersed in the solvent. The positive electrode active material and binder are not particularly limited, but may be selected, for example, from the aforementioned materials as appropriate. Examples of the solvent include water, N-methyl-2-pyrrolidone, methyl ethyl ketone, acetone, cyclohexanone, butyl acetate, methanol, ethanol, and the like, but are not limited to them as long as they are capable of dissolving or dispersing the binder. The positive electrode paint preferably further contains an electrical conduction enhancer. The electrical conduction enhancer is not particularly limited, and may be selected from the aforementioned materials as appropriate. Furthermore, the positive electrode paint may optionally further contain various kinds of additives such as a dispersant, a surfactant, a rheological conditioner, and the like.

In the negative electrode coating step, the negative electrode paint is coated on a negative electrode current collector, so that a negative electrode composed of a negative electrode mixture layer and the negative electrode current collector is formed.

The negative electrode current collector, as mentioned above, is not particularly limited as long as it has a high electrical conductivity, and is copper foil or the like, for example.

The negative electrode paint contains a solvent, a negative electrode active material and a binder that are dissolved or dispersed in the solvent. The negative electrode active material and binder are not particularly limited, but may be selected, for example, from the aforementioned materials as appropriate. The solvent is not particularly limited as long as it is capable of dissolving or dispersing the binder. The same solvent as used in the positive electrode paint can be used. The negative electrode paint may optionally further contain various kinds of additives such as an electrical conduction enhancer, a dispersant, a surfactant, a rheological conditioner, and the like, similarly to the positive electrode paint.

The production method according to the present invention is characterized in that at least one of the positive paint and the negative paint contains hollow resin particles. The hollow resin particles contained in these paints are collapsed in the following rolling step (the positive electrode rolling step or the negative electrode rolling step).

Examples of the material for the hollow resin particles include polyethylene, polypropylene, acryl, fluororesin, cellulose derivative, and the like, but are not limited to them as long as they can be collapsed in the following rolling step. The shape of the hollow resin particles is not particularly limited, but is spherical, for example. An average diameter of the hollow resin particles contained in the positive electrode paint is 0.1 µm or more and 10 µm or less, and an average diameter of the hollow resin particles contained in the negative electrode paint is 0.1 µm or more and 20 µm or less. In the production method according to the present invention, it is particularly important that the resin particles incorporated in the paint are hollow. The volume percentage of the hollow part is preferably 20% or more and 80% or less and more preferably 50% or more and 70% or less. When the percentage of the hollow part is too low, the hollow resin particles are not easily collapsed, so that rolling becomes difficult, and the discharge capacity is not expected to be increased. On the other hand, when the percentage of the hollow part is too high, the hollow resin particles are collapsed in the course of preparing the positive electrode paint or the negative electrode paint, so that the effect of incorporating the hollow resin particles cannot be attained.

The amount of the hollow resin particles, when they are incorporated in the positive electrode paint, is preferably 1 part by weight or more and 20 parts by weight or less with respect to 100 parts by weight of the positive electrode active material. When they are incorporated in the negative electrode paint, the amount is preferably 1 part by weight or more and 50 parts by weight or less with respect to 100 parts by weight of the negative electrode active material. When the number of resin particles is too small, the rate characteristics becomes lowered. On the other hand, when it is too high, the discharge capacity becomes lowered.

In the positive electrode coating step and the negative electrode coating step, the means of coating the paint containing the hollow resin particles on a current collector is not particularly limited, but may be selected from methods known in the art as appropriate.

Figure 2A:
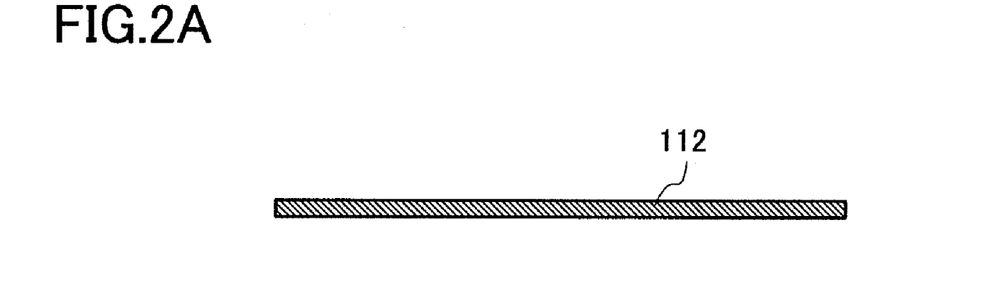
FIG. 2A shows schematically a state of a positive electrode current collector after preparation.
Figure 2B:
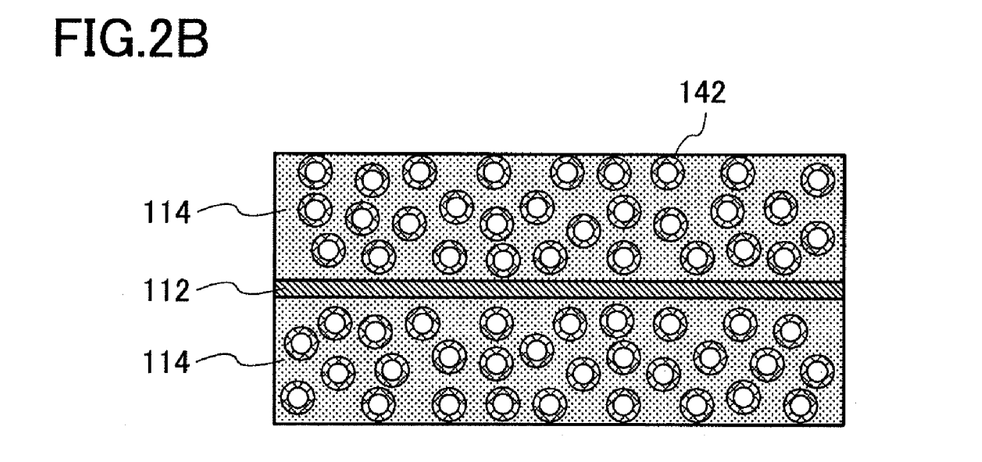
FIG. 2B shows schematically a state of a positive electrode current collector after a positive electrode mixture layer 114 is formed on both sides of the positive electrode current collector.

FIG. 2A shows schematically a state of the positive electrode current collector 112 after preparation. FIG. 2B shows schematically a state of the positive electrode current collector 112 after the positive electrode mixture layers 114 that contain hollow resin particles 142 are formed on both sides of the positive electrode current collector 112 by coating and drying the positive electrode paint containing the hollow resin particles 142.

Figure 3A:
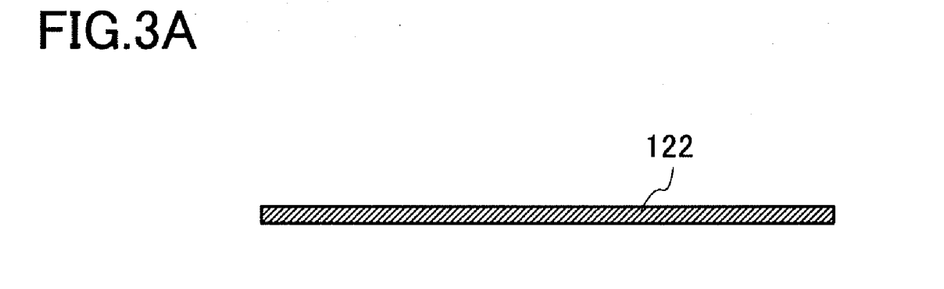
FIG. 3A shows schematically a state of a negative electrode current collector after preparation.
Figure 3B:
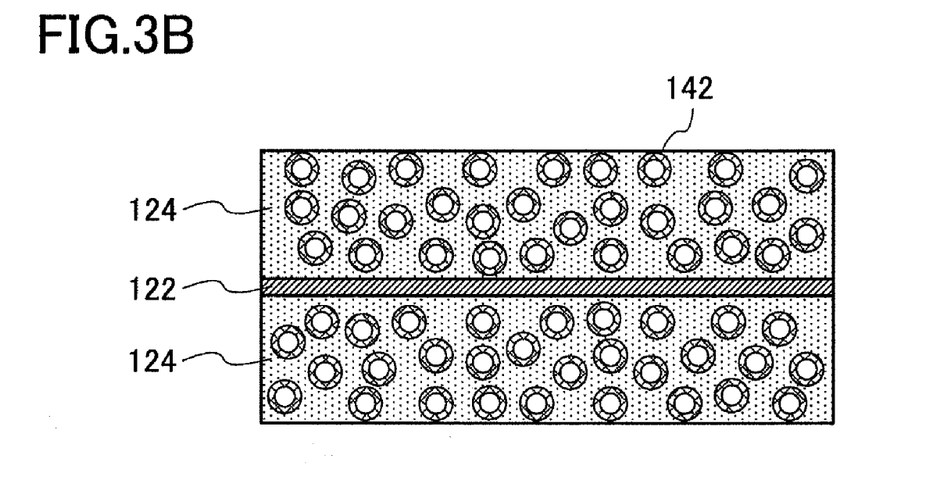
FIG. 3B shows schematically a state of a negative electrode current collector after a negative electrode mixture layer is formed on both sides of the negative electrode current collector.

FIG. 3A shows schematically a state of the negative electrode current collector 112 after preparation. FIG. 3B shows schematically a state of the negative electrode current collector 122 after the negative electrode mixture layers 124 that contain hollow resin particles 142 are formed on both sides of the negative electrode current collector 122 by coating and drying the negative electrode paint containing the hollow resin particles 142.

Rolling Step

In the positive electrode rolling step, the positive electrode that is formed by coating the positive electrode paint on the positive electrode current collector is rolled so as to increase the positive electrode active material density in the positive electrode mixture layer. Similarly, in the negative electrode rolling step, the negative electrode that is formed by coating the negative electrode paint on the negative electrode current collector is rolled so as to increase the negative electrode active material density in the negative electrode mixture layer.

In these rolling steps, the hollow resin particles incorporated in the mixture layer facilitate collapsing of the mixture layer by promoting sliding among the active material. In the case of incorporating resin particles without containing hollow part into the mixture layer, even though the sliding among the active material is improved, the active material density is lowered by an amount of the volume shared by the resin particles. Therefore, it is necessary that the hollow resin particles that are easily collapsed by the rolling be incorporated in the mixture layer.

Further, in these rolling steps, the hollow resin particles incorporated in the mixture layer are collapsed by the rolling, so that the collapsed resin particles form unevenness on the surface of the mixture layer and that open-pores derived from the volume of the hollow part are formed in the mixture layer as well.

In the positive electrode rolling step and the negative electrode rolling step, the means of rolling the positive electrode or the negative electrode is not particularly limited, but may be selected from the means known in the art as appropriate. The rolling pressure (linear pressure) may be selected as appropriate in accordance with the diameter of rolls used, the width of the positive electrode mixture layer or the negative electrode mixture layer, and the like, but it is preferred that the rolling pressure is selected in a manner that the resin particle density (collapsed hollow resin particle density) after the rolling becomes 1 g/cm$^3$ or more and 20 g/cm$^3$ or less. Note that rolling may be repeated until the resin particle density becomes 1 g/cm$^3$ or more and 20 g/cm$^3$ or less.

Figure 2C:
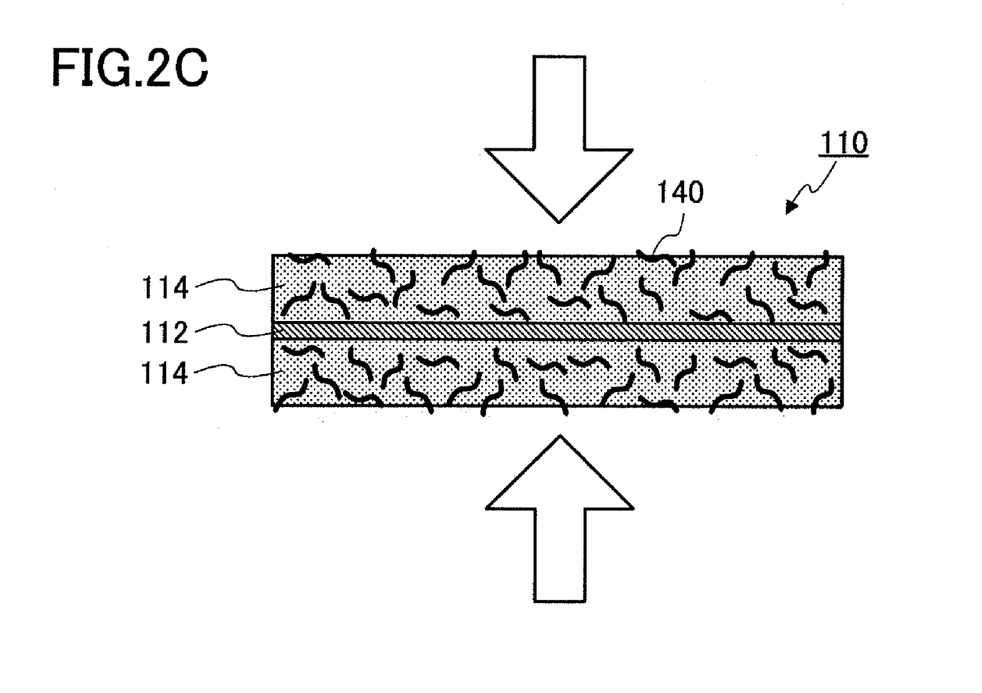
FIG. 2C shows schematically a state of a positive electrode after rolling.
Figure 3C:
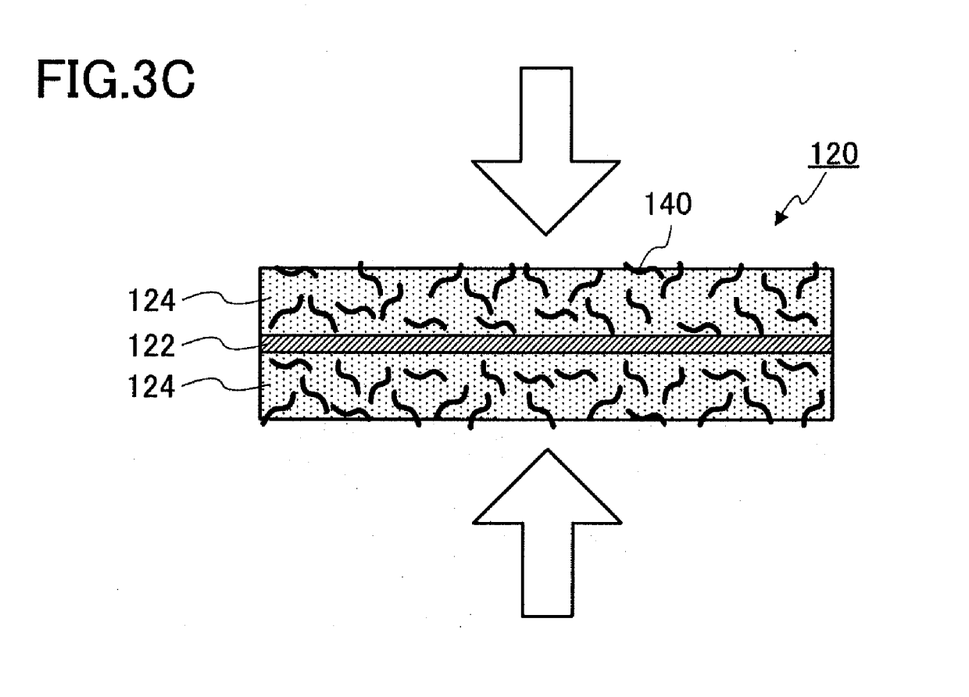
FIG. 3C shows schematically a state of a negative electrode after rolling.

FIG. 2C shows schematically a state of the positive electrode 110 after the rolling. FIG. 3C shows schematically a state of the negative electrode 120 after the rolling. In these figures, the resin particles 140 are made through collapsing the hollow resin particles 142 by the rolling.

Stacking Step

In the stacking step, the positive electrode after the rolling, the separator, and the negative electrode after the rolling are stuck in layers to produce a rechargeable lithium ion battery.

The separator disposed between the positive electrode and the negative electrode is not particularly limited as long as it separates the positive electrode and the negative electrode from each other as mentioned above, and lithium ions can penetrate to a material composing the separator or through voids formed in the separator. The material that forms the separator is not particularly limited, but may be selected appropriately from materials mentioned above, for example.

As mentioned above, the positive electrode, the negative electrode, and the separator are preferably disposed in the electrolyte solution. For example, a power generation element that is formed by disposing the separator between the positive electrode and the negative electrode is inserted in a stainless case, and then the electrolyte solution is injected into the stainless case, so that the positive electrode, the negative electrode, and the separator can be disposed in the electrolyte solution. A battery formed in this way may be a layer-built type or a wound-up type.

Examples of the non-aqueous solvent used for the electrolyte solution include ethylene carbonate, propylene carbonate, butylene carbonate, dimethyl carbonate, diethyl carbonate, γ-butyrolactone, sulfolane, acetonitrile, 1,2-dimethoxyethane, 1,3-dimethoxypropane, diethyl ether, tetrahydrofuran, 2-methyltetrahydrofuran, and the like, but are not limited to them. The non-aqueous solvent may be used singly or in a combination of two or more kinds.

Examples of the electrolyte include a lithium salt such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$) lithium bistrifluoromethylsulfonylimide ($LiN(CF_3SO_2)_2$), and the like, but are not limited to them.

FIG. 1C shows schematically a state after the positive electrode 110 containing the resin particles 140, the separator 130, and the negative electrode 120 containing resin particles 140 are stuck in layers.

As mentioned above, in the production method according to the present invention, by incorporating the hollow resin particles in the mixture layer before the rolling, it becomes attainable to increase the active material density easily by rolling the mixture layer and to form a number of open pores in the mixture layer. Therefore, in accordance with the production method of the present invention, the capacity and rate characteristics of rechargeable lithium ion batteries can be increased.

Hereinafter, the present invention will be further described in detail with reference to the following embodiments, but it should be construed that the invention is in no way limited to those embodiments.

EXAMPLE

Embodiment 1

In Embodiment 1, by using a positive electrode paint containing hollow resin particles, a rechargeable lithium ion battery (the positive electrode mixture layer contained the resin particles) according to the present invention was fabricated.

Preparation of Positive Electrode Plate

To 100 parts by weight of lithium cobaltate (positive electrode active material), 3 parts by weight of carbon black (electrical conduction enhancer), 3 parts by weight of poly(vinylidene fluoride) (binder), 40 parts by weight of N-methyl-2-pyrrolidone (solvent), and 5 parts by weight of polyethylene hollow particles (particle size: 5 μm, volume percentage of hollow part: 50%, Mitsui Chemicals, Inc.) were added to prepare a positive electrode paint. The positive electrode paint was coated in a thickness of 0.15 mm on one side of a 0.02 mm thick aluminum foil (positive electrode current collector) with a doctor blade, and then dried at 100° C. in a hot-air drying oven. Similarly, on the opposite side of the aluminum foil, a positive electrode mixture layer was also formed. The obtained plate having the positive electrode mixture layer on both sides of the aluminum foil was rolled with a roll machine in a manner that the total thickness became 0.2 mm, and a positive electrode plate was obtained.

Preparation of Negative Electrode Plate

To 100 parts by weight of graphite (negative electrode active material), 5 parts by weight of poly(vinylidene fluoride) (binder), and 50 parts by weight of N-methyl-2-pyrrolidone (solvent) were added to prepare a negative electrode paint. The negative electrode paint was coated in a thickness of 0.15 mm on one side of a 0.02 mm thick copper foil (negative electrode current collector) with a doctor blade, and then dried at 100° C. in a hot-air drying oven. Similarly, on the opposite side of the copper foil, a negative electrode mixture layer was also formed. The obtained plate having the negative electrode mixture layer on both sides of the copper foil was rolled with a roll machine in a manner that the total thickness became 0.2 mm, and a negative electrode plate was obtained.

Assembling

A power generation element prepared by disposing a porous polymer film (separator) of polyethylene with a thickness of 0.02 mm and a porosity of 40% between the above prepared positive electrode plate and the negative electrode plate was wound and inserted in a cylindrical stainless steel case. In this cylindrical stainless steel case, an electrolyte solution prepared by adding $LiPF_6$ to a mixed solution of ethylene carbonate and diethyl carbonate was injected, and a cylindrical rechargeable lithium ion battery was assembled.

Measurement of Rate Characteristics

The assembled battery was charged at a constant current mode of 0.2 C (100 mA) and then further charged at a constant voltage mode of 4.2 V. Discharging of the battery was performed separately at a different current density of 0.2 C (100 mA), 1 C (500 mA), or 2 C (1000 mA), and the discharge capacity was evaluated at a discharge voltage of 3 V. The discharge capacity obtained at a rate of 0.2 C was set as 100%, and the rate characteristics were evaluated in terms of the capacity ratio for each discharging. The rate characteristics thus obtained are shown in Table 1.

Embodiment 2

In Embodiment 2, by using a negative electrode paint containing hollow resin particles, a rechargeable lithium ion battery (the negative electrode mixture layer contained the resin particles) according to the present invention was fabricated.

Preparation of Positive Electrode Plate

To 100 parts by weight of lithium cobaltate (positive electrode active material), 3 parts by weight of carbon black (electrical conduction enhancer), 3 parts by weight of poly (vinylidene fluoride) (binder), and 40 parts by weight of N-methyl-2-pyrrolidone (solvent) were added to prepare a positive electrode paint. The positive electrode paint was coated in a thickness of 0.15 mm on one side of a 0.02 mm thick aluminum foil (positive electrode current collector) with a doctor blade, and then dried at 100° C. in a hot-air drying oven. Similarly, on the opposite side of the aluminum foil, a positive electrode mixture layer was also formed. The obtained plate having the positive electrode mixture layer on both sides of the aluminum foil was rolled with a roll machine in a manner that the total thickness became 0.2 mm, and a positive electrode plate was obtained.

Preparation of Negative Electrode Plate

To 100 parts by weight of graphite (negative electrode active material), 0.8 parts by weight of poly(vinylidene fluoride) (binder), 50 parts by weight of N-methyl-2-pyrrolidone (solvent), and 5 parts by weight of polyethylene hollow particles (particle size: 5 μm, volume percentage of hollow part:

50%, Mitsui Chemicals, Inc.) were added to prepare a negative electrode paint. The negative electrode paint was coated in a thickness of 0.15 mm on one side of a 0.02 mm thick copper foil (negative electrode current collector) with a doctor blade, and then dried at 100° C. in a hot-air drying oven. Similarly, on the opposite side of the copper foil, a negative electrode mixture layer was also formed. The obtained plate having the negative electrode mixture layer on both sides of the copper foil was rolled with a roll machine in a manner that the total thickness became 0.2 mm, and a negative electrode plate was obtained.

Assembling

Similarly to Embodiment 1, a cylindrical rechargeable lithium ion battery was assembled.

Measurement of Rate Characteristics

Similarly to Embodiment 1, the discharge capacity was evaluated. The discharge capacity obtained at a rate of 0.2 C in Embodiment 1 was set as 100%, and the rate characteristics were evaluated in terms of the capacity ratio for each discharging. The rate characteristics thus obtained are shown in Table 1.

Embodiment 3

In Embodiment 3, by using a positive electrode paint and a negative electrode paint that containing hollow resin particles, a rechargeable lithium ion battery (both positive electrode mixture layer and negative electrode mixture layer contained the resin particles) according to the present invention was fabricated.

Preparation of Positive Electrode Plate

Similarly to Embodiment 1, a positive electrode plate with a positive electrode mixture layer containing resin particles was prepared.

Preparation of Negative Electrode Plate

Similarly to Embodiment 2, a negative electrode plate with a negative electrode mixture layer containing resin particles was prepared.

Assembling

Similarly to Embodiment 1, a cylindrical rechargeable lithium ion battery was assembled.

Measurement of Rate Characteristics

Similarly to Embodiment 1, the discharge capacity was evaluated. The discharge capacity obtained at a rate of 0.2 C in Embodiment 1 was set as 100%, and the rate characteristics were evaluated in terms of the capacity ratio for each discharging. The rate characteristics thus obtained are shown in Table 1.

Embodiment 4

In Embodiment 4, similarly to Embodiment 1, by using a positive electrode paint containing hollow resin particles, a rechargeable lithium ion battery (the positive electrode mixture layer contained the resin particles) according to the present invention was fabricated. In Embodiment 4, the content of the hollow resin particles in the positive electrode paint was made to be smaller than that in Embodiment 1.

Preparation of Positive Electrode Plate

With 100 parts by weight of lithium cobaltate (positive electrode active material), 3 parts by weight of carbon black (electrical conduction enhancer), 3 parts by weight of poly (vinylidene fluoride) (binder), 40 parts by weight of N-methyl-2-pyrrolidone (solvent), and 0.8 parts by weight of polyethylene hollow particles (particle size: 5 μm, volume percentage of hollow part: 50%, Mitsui Chemicals, Inc.) were added to prepare a positive electrode paint. The positive electrode paint was coated in a thickness of 0.15 mm on one side of a 0.02 mm thick aluminum foil (positive electrode current collector) with a doctor blade, and then dried at 100° C. in a hot-air drying oven. Similarly, on the opposite side of the aluminum foil, a positive electrode mixture layer was also formed. The obtained plate having the positive electrode mixture layer on both sides of the aluminum foil was rolled with a roll machine in a manner that the total thickness became 0.2 mm, and a positive electrode plate was obtained.

Preparation of Negative Electrode Plate

Similarly to Embodiment 1, a negative electrode plate with a negative electrode mixture layer without containing resin particles was prepared.

Assembling

Similarly to Embodiment 1, a cylindrical rechargeable lithium ion battery was assembled.

Measurement of Rate Characteristics

Similarly to Embodiment 1, the discharge capacity was evaluated. The discharge capacity obtained at a rate of 0.2 C in Embodiment 1 was set as 100%, and the rate characteristics were evaluated in terms of the capacity ratio for each discharging. The rate characteristics thus obtained are shown in Table 1.

Embodiment 5

In Embodiment 5, similarly to Embodiments 1 and 4, by using a positive electrode paint containing hollow resin particles, a rechargeable lithium ion battery (the positive electrode mixture layer contained the resin particles) according to the present invention was fabricated. In Embodiment 5, the content of the hollow resin particles in the positive electrode paint was made to be larger than that in Embodiment 1.

Preparation of Positive Electrode Plate

To 100 parts by weight of lithium cobaltate (positive electrode active material), 3 parts by weight of carbon black (electrical conduction enhancer), 3 parts by weight of poly (vinylidene fluoride) (binder), 40 parts by weight of N-methyl-2-pyrrolidone (solvent), and 25 parts by weight of polyethylene hollow particles (particle size: 5 μm, volume percentage of hollow part: 50%, Mitsui Chemicals, Inc.) were added to prepare a positive electrode paint. The positive electrode paint was coated in a thickness of 0.15 mm on one side of a 0.02 mm thick aluminum foil (positive electrode current collector) with a doctor blade, and then dried at 100° C. in a hot-air drying oven. Similarly, on the opposite side of the aluminum foil, a positive electrode mixture layer was also formed. The obtained plate having the positive electrode mixture layer on both sides of the aluminum foil was rolled with a roll machine in a manner that the total thickness became 0.2 mm, and a positive electrode plate was obtained.

Preparation of Negative Electrode Plate

Similarly to Embodiment 1, a negative electrode plate with a negative electrode mixture layer without containing resin particles was prepared.

Assembling

Similarly to Embodiment 1, a cylindrical rechargeable lithium ion battery was assembled.

Measurement of Rate Characteristics

Similarly to Embodiment 1, the discharge capacity was evaluated. The discharge capacity obtained at a rate of 0.2 C in Embodiment 1 was set as 100%, and the rate characteristics were evaluated in terms of the capacity ratio for each discharging. The rate characteristics thus obtained are shown in Table 1.

Embodiment 6

In Embodiment 6, similarly to Embodiment 1, by using a positive electrode paint containing hollow resin particles, a rechargeable lithium ion battery (the positive electrode mixture layer contained the hollow resin particles) according to the present invention was fabricated. In Embodiment 6, the hollow resin particles had a smaller size as compared with the particles used in Embodiment 1.

Preparation of Positive Electrode Plate

To 100 parts by weight of lithium cobaltate (positive electrode active material), 3 parts by weight of carbon black (electrical conduction enhancer), 3 parts by weight of poly(vinylidene fluoride) (binder), 40 parts by weight of N-methyl-2-pyrrolidone (solvent), and 5 parts by weight of polyethylene hollow particles (particle size: 0.07 μm, volume percentage of hollow part: 50%, Mitsui Chemicals, Inc.) were added to prepare a positive electrode paint. The positive electrode paint was coated in a thickness of 0.15 mm on one side of a 0.02 mm thick aluminum foil (positive electrode current collector) with a doctor blade, and then dried at 100° C. in a hot-air drying oven. Similarly, on the opposite side of the aluminum foil, a positive electrode mixture layer was also formed. The obtained plate having the positive electrode mixture layer on both sides of the aluminum foil was rolled with a roll machine in a manner that the total thickness became 0.2 mm, and a positive electrode plate was obtained.

Preparation of Negative Electrode Plate

Similarly to Embodiment 1, a negative electrode plate with a negative electrode mixture layer without containing resin particles was prepared.

Assembling

Similarly to Embodiment 1, a cylindrical rechargeable lithium ion battery was assembled.

Measurement of Rate Characteristics

Similarly to Embodiment 1, the discharge capacity was evaluated. The discharge capacity obtained at a rate of 0.2 C in Embodiment 1 was set as 100%, and the rate characteristics were evaluated in terms of the capacity ratio for each discharging. The rate characteristics thus obtained are shown in Table 1.

Embodiment 7

In Embodiment 7, similarly to Embodiments 1 and 6, by using a positive electrode paint containing hollow resin particles, a rechargeable lithium ion battery (the positive electrode mixture layer contained the resin particles) according to the present invention was fabricated. In Embodiment 7, the hollow resin particles had a larger size as compared with the particles used in Embodiment 1.

Preparation of Positive Electrode Plate

To 100 parts by weight of lithium cobaltate (positive electrode active material), 3 parts by weight of carbon black (electrical conduction enhancer), 3 parts by weight of poly(vinylidene fluoride) (binder), 40 parts by weight of N-methyl-2-pyrrolidone (solvent), and 5 parts by weight of polyethylene hollow particles (particle size: 15 μm, volume percentage of hollow part: 50%, Mitsui Chemicals, Inc.) were added to prepare a positive electrode paint. The positive electrode paint was coated in a thickness of 0.15 mm on one side of a 0.02 mm thick aluminum foil (positive electrode current collector) with a doctor blade, and then dried at 100° C. in a hot-air drying oven. Similarly, on the opposite side of the aluminum foil, a positive electrode mixture layer was also formed. The obtained plate having the positive electrode mixture layer on both sides of the aluminum foil was rolled with a roll machine in a manner that the total thickness became 0.2 mm, and a positive electrode plate was obtained.

Preparation of Negative Electrode Plate

Similarly to Embodiment 1, a negative electrode plate with a negative electrode mixture layer without containing resin particles was prepared.

Assembling

Similarly to Embodiment 1, a cylindrical rechargeable lithium ion battery was assembled.

Measurement of Rate Characteristics

Similarly to Embodiment 1, the discharge capacity was evaluated. The discharge capacity obtained at a rate of 0.2 C in Embodiment 1 was set as 100%, and the rate characteristics were evaluated in terms of the capacity ratio for each discharging. The rate characteristics thus obtained are shown in Table 1.

Embodiment 8

In Embodiment 8, similarly to Embodiment 2, by using a negative electrode paint containing hollow resin particles, a rechargeable lithium ion battery (the negative electrode mixture layer contained the resin particles) according to the present invention was fabricated. In Embodiment 8, the content of the hollow resin particles in the negative electrode paint was made to be smaller than that in Embodiment 2.

Preparation of Positive Electrode Plate

Similarly to Embodiment 2, a positive electrode plate with a positive electrode mixture layer without containing resin particles was prepared.

Preparation of Negative Electrode Plate

To 100 parts by weight of graphite (negative electrode active material), 0.8 parts by weight of poly(vinylidene fluoride) (binder), 50 parts by weight of N-methyl-2-pyrrolidone (solvent), and 0.8 parts by weight of polyethylene hollow particles (particle size: 5 μm, volume percentage of hollow part: 50%, Mitsui Chemicals, Inc.) were added to prepare a negative electrode paint. The negative electrode paint was coated in a thickness of 0.15 mm on one side of a 0.02 mm thick copper foil (negative electrode current collector) with a doctor blade, and then dried at 100° C. in a hot-air drying oven. Similarly, on the opposite side of the copper foil, a negative electrode mixture layer was also formed. The obtained plate having the negative electrode mixture layer on both sides of the copper foil was rolled with a roll machine in a manner that the total thickness became 0.2 mm, and a negative electrode plate was obtained.

Assembling

Similarly to Embodiment 1, a cylindrical rechargeable lithium ion battery was assembled.

Measurement of Rate Characteristics

Similarly to Embodiment 1, the discharge capacity was evaluated. The discharge capacity obtained at a rate of 0.2 C in Embodiment 1 was set as 100%, and the rate characteristics were evaluated in terms of the capacity ratio for each discharging. The rate characteristics thus obtained are shown in Table 1.

Embodiment 9

In Embodiment 9, similarly to Embodiments 2 and 8, by using a negative electrode paint containing hollow resin particles, a rechargeable lithium ion battery (the negative electrode mixture layer contained the resin particles) according to the present invention was fabricated. In Embodiment 9, the content of the hollow resin particles in the negative electrode paint was made to be larger than that in Embodiment 2.

Preparation of Positive Electrode Plate

Similarly to Embodiment 2, a positive electrode plate with a positive electrode mixture layer without containing resin particles was prepared.

Preparation of Negative Electrode Plate

To 100 parts by weight of graphite (negative electrode active material), 0.8 parts by weight of poly(vinylidene fluoride) (binder), 50 parts by weight of N-methyl-2-pyrrolidone (solvent), and 60 parts by weight of polyethylene hollow particles (particle size: 5 μm, volume percentage of hollow part: 50%, Mitsui Chemicals, Inc.) were added to prepare a negative electrode paint. The negative electrode paint was coated in a thickness of 0.15 mm on one side of a 0.02 mm thick copper foil (negative electrode current collector) with a doctor blade, and then dried at 100° C. in a hot-air drying oven. Similarly, on the opposite side of the copper foil, a negative electrode mixture layer was also formed. The obtained plate having the negative electrode mixture layer on both sides of the copper foil was rolled with a roll machine in a manner that the total thickness became 0.2 mm, and a negative electrode plate was obtained.

Assembling

Similarly to Embodiment 1, a cylindrical rechargeable lithium ion battery was assembled.

Measurement of Rate Characteristics

Similarly to Embodiment 1, the discharge capacity was evaluated. The discharge capacity obtained at a rate of 0.2 C in Embodiment 1 was set as 100%, and the rate characteristics were evaluated in terms of the capacity ratio for each discharging. The rate characteristics thus obtained are shown in Table 1.

Embodiment 10

In Embodiment 10, similarly to Embodiment 2, by using a negative electrode paint containing hollow resin particles, a rechargeable lithium ion battery (the negative electrode mixture layer contained the resin particles) according to the present invention was fabricated. In Embodiment 10, the hollow resin particles had a smaller size as compared with the particles used in Embodiment 2.

Preparation of Positive Electrode Plate

Similarly to Embodiment 2, a positive electrode plate with a positive electrode mixture layer without containing resin particles was prepared.

Preparation of Negative Electrode Plate

To 100 parts by weight of graphite (negative electrode active material), 0.8 parts by weight of poly(vinylidene fluoride) (binder), 50 parts by weight of N-methyl-2-pyrrolidone (solvent), and 5 parts by weight of polyethylene hollow particles (particle size: 0.07 μm, volume percentage of hollow part: 50%, Mitsui Chemicals, Inc.) were added to prepare a negative electrode paint. The negative electrode paint was coated in a thickness of 0.15 mm on one side of a 0.02 mm thick copper foil (negative electrode current collector) with a doctor blade, and then dried at 100° C. in a hot-air drying oven. Similarly, on the opposite side of the copper foil, a negative electrode mixture layer was also formed. The obtained plate having the negative electrode mixture layer on both sides of the copper foil was rolled with a roll machine in a manner that the total thickness became 0.2 mm, and a negative electrode plate was obtained.

Assembling

Similarly to Embodiment 1, a cylindrical rechargeable lithium ion battery was assembled.

Measurement of Rate Characteristics

Similarly to Embodiment 1, the discharge capacity was evaluated. The discharge capacity obtained at a rate of 0.2 C in Embodiment 1 was set as 100%, and the rate characteristics were evaluated in terms of the capacity ratio for each discharging. The rate characteristics thus obtained are shown in Table 1.

Embodiment 11

In Embodiment 11, similarly to Embodiments 2 and 10, by using a negative electrode paint containing hollow resin particles, a rechargeable lithium ion battery (the negative electrode mixture layer contained the resin particles) according to the present invention was fabricated. In Embodiment 11, the hollow resin particles had a larger size as compared with the particles used in Embodiment 2.

Preparation of Positive Electrode Plate

Similarly to Embodiment 2, a positive electrode plate with a positive electrode mixture layer without containing resin particles was prepared.

Preparation of Negative Electrode Plate

To 100 parts by weight of graphite (negative electrode active material), 0.8 parts by weight of poly(vinylidene fluoride) (binder), 50 parts by weight of N-methyl-2-pyrrolidone (solvent), and 5 parts by weight of polyethylene hollow particles (particle size: 25 μm, volume percentage of hollow part: 50%, Mitsui Chemicals, Inc.) were added to prepare a negative electrode paint. The negative electrode paint was coated in a thickness of 0.15 mm on one side of a 0.02 mm thick copper foil (negative electrode current collector) with a doctor blade, and then dried at 100° C. in a hot-air drying oven. Similarly, on the opposite side of the copper foil, a negative electrode mixture layer was also formed. The obtained plate having the negative electrode mixture layer on both sides of the copper foil was rolled with a roll machine in a manner that the total thickness became 0.2 mm, and a negative electrode plate was obtained.

Assembling

Similarly to Embodiment 1, a cylindrical rechargeable lithium ion battery was assembled.

Measurement of Rate Characteristics

Similarly to Embodiment 1, the discharge capacity was evaluated. The discharge capacity obtained at a rate of 0.2 C in Embodiment 1 was set as 100%, and the rate characteristics were evaluated in terms of the capacity ratio for each discharging. The rate characteristics thus obtained are shown in Table 1.

Comparative Embodiment

In Comparative Embodiment, by using a positive electrode paint and a negative electrode paint without containing hollow resin particles, a rechargeable lithium ion battery (both positive electrode mixture layer and negative electrode mixture layer contained no resin particles) was fabricated.

Preparation of Positive Electrode Plate

Similarly to Embodiment 2, a positive electrode plate with a positive electrode mixture layer without containing resin particles was prepared.

Preparation of Negative Electrode Plate

Similarly to Embodiment 1, a negative electrode plate with a negative electrode mixture layer without containing resin particles was prepared.

Assembling

Similarly to Embodiment 1, a cylindrical rechargeable lithium ion battery was assembled.

Measurement of Rate Characteristics

Similarly to Embodiment 1, the discharge capacity was evaluated. The discharge capacity obtained at a rate of 0.2 C in Embodiment 1 was set as 100%, and the rate characteristics were evaluated in terms of the capacity ratio for each discharging. The rate characteristics thus obtained are shown in Table 1.

Table 1 shows the results of the measurement of rate characteristics of the rechargeable lithium ion batteries fabricated in each Embodiment.

TABLE 1

|  | 0.2 C discharge capacity ratio (%) | 1 C discharge capacity ratio (%) | 2 C discharge capacity ratio (%) |
|---|---|---|---|
| Embodiment 1 | 100 | 96 | 86 |
| Embodiment 2 | 100 | 96 | 83 |
| Embodiment 3 | 100 | 94 | 82 |
| Embodiment 4 | 100 | 82 | 72 |
| Embodiment 5 | 60 | 58 | 56 |
| Embodiment 6 | 100 | 80 | 70 |
| Embodiment 7 | 70 | 67 | 65 |
| Embodiment 8 | 100 | 81 | 71 |
| Embodiment 9 | 59 | 56 | 56 |
| Embodiment 10 | 100 | 78 | 70 |
| Embodiment 11 | 69 | 67 | 65 |
| Comparative Embodiment | 100 | 82 | 72 |

In Table 1, a comparison among Embodiments 1 to 3 and Comparative Embodiment shows that not only the 0.2 C discharge capacity was increased but also the rate characteristics were improved by incorporating the hollow resin particles in the positive electrode paint or the negative electrode paint.

A comparison between Embodiment 1 and Embodiment 4 shows that the rate characteristics can be still more improved by incorporating the hollow resin particles in the positive electrode paint in an amount of 1 part by weight or more with respect to 100 parts by weight of the positive electrode active material. Similarly, a comparison between Embodiment 2 and Embodiment 8 shows that the rate characteristics can be still more improved by incorporating the hollow resin particles in the negative electrode paint in an amount of 1 part by weight or more with respect to 100 parts by weight of the negative electrode active material.

A comparison between Embodiment 1 and Embodiment 5 shows that the 0.2 C discharge capacity can be increased by incorporating the hollow resin particles in the positive electrode paint in an amount of 20 parts by weight or less with respect to 100 parts by weight of the positive electrode active material. Similarly, a comparison between Embodiment 2 and Embodiment 9 shows that the 0.2 C discharge capacity can be increased by incorporating the hollow resin particles in the negative electrode paint in an amount of 50 parts by weight or less with respect to 100 parts by weight of the negative electrode active material.

A comparison between Embodiment 1 and Embodiment 6 shows that open pores can be formed in the positive electrode mixture layer and that the rate characteristics can be still more improved by incorporating the hollow resin particles with a particle size of 0.1 µm or more in the positive electrode paint. Similarly, a comparison between Embodiment 2 and Embodiment 10 shows that open pores can be formed in the negative electrode mixture layer and that the rate characteristics can be still more improved by incorporating the hollow resin particles with a particle size of 0.1 µm or more in the negative electrode paint.

A comparison between Embodiment 1 and Embodiment 7 shows that the active material density can be increased in the positive electrode mixture layer and that the 0.2 C discharge capacity can be increased by incorporating the hollow resin particles with a particle size of 10 µm or less in the positive electrode paint. Similarly, a comparison between Embodiment 2 and Embodiment 11 shows that the active material density can be increased in the negative electrode mixture layer and that the 0.2 C discharge capacity can be increased by incorporating the hollow resin particles with a particle size of 20 µm or less in the negative electrode paint.

Embodiment 12

In embodiment 12, it was demonstrated that increasing the positive electrode active material density in the positive electrode mixture layer was attainable by incorporating hollow resin particles in the positive electrode paint.

Preparation of Positive Electrode Mixture Layer Containing Resin Particles

To 100 parts by weight of lithium cobaltate (positive electrode active material), 3 parts by weight of carbon black (electrical conduction enhancer), 3 parts by weight of poly (vinylidene fluoride) (binder), 40 parts by weight of N-methyl-2-pyrrolidone (solvent), and 5 parts by weight of polyethylene hollow particles (particle size: 5 µm, volume percentage of hollow part: 50%, Mitsui Chemicals, Inc.) were added to prepare a positive electrode paint. The positive electrode paint was coated in a thickness of 0.15 mm on one side of a 0.02 mm thick aluminum foil (positive electrode current collector) with a doctor blade, and then dried at 100° C. in a hot-air drying oven. Similarly, on the opposite side of the aluminum foil, a positive electrode mixture layer was also formed.

Preparation of Positive Electrode Mixture Layer without Containing Resin Particles To 100 parts by weight of lithium cobaltate (positive electrode active material), 3 parts by weight of carbon black (electrical conduction enhancer), 3 parts by weight of poly (vinylidene fluoride) (binder), and 40 parts by weight of N-methyl-2-pyrrolidone (solvent) were added to prepare a positive electrode paint. The positive electrode paint was coated in a thickness of 0.15 mm on one side of a 0.02 mm thick aluminum foil (positive electrode current collector) with a doctor blade, and then dried at 100° C. in a hot-air drying oven. Similarly, on the opposite side of the aluminum foil, a positive electrode mixture layer was also formed.

Measurement of Active Material Density

A positive electrode plate (positive electrode plate of the present invention) with a positive electrode mixture layer containing resin particles and another positive electrode plate (positive electrode plate of Comparative Embodiment) with a positive electrode mixture layer without containing resin particles were each rolled five times with a rolling machine. The roller of the roll machine had a diameter of 500 mm and a linear pressure of 1 ton/m. Further, the width of each electrode plate to be rolled was 500 mm. For each positive electrode plate, the positive electrode active material density in the positive electrode mixture layer was measured after every rolling.

Table 2 shows the positive electrode active material density in the positive electrode mixture layer for the positive electrode plate of the present invention and the positive electrode plate of Comparative Embodiment.

TABLE 2

| Number of rolling | Active material density (g/cm³) | |
| --- | --- | --- |
| | Present invention | Comparative Embodiment |
| 0 | 2.38 | 2.38 |
| 1 | 3.78 | 3.78 |
| 2 | 3.82 | 3.79 |
| 3 | 3.84 | 3.80 |
| 4 | 3.84 | 3.79 |

As shown in Table 2, by only one time of rolling, the active material density showed little difference between the positive electrode plate of the present invention and the positive electrode plate of Comparative Embodiment. However, by two or more times of rolling, the active material density of the positive electrode plate of the present invention became higher than that of the positive electrode plate of Comparative Embodiment. This result shows that the positive electrode active material density can be increased in the positive electrode mixture layer by incorporating the hollow resin particles in the positive electrode paint.

Embodiment 13

In Embodiment 13, it was demonstrated that forming unevenness and open pores in the positive electrode mixture layer was attainable by incorporating hollow resin particles in the positive electrode paint.

Preparation of Positive Electrode Mixture Layer Containing Resin Particles

To 100 parts by weight of lithium cobaltate (positive electrode active material), 3 parts by weight of carbon black (electrical conduction enhancer), 3 parts by weight of poly (vinylidene fluoride) (binder), 40 parts by weight of N-methyl-2-pyrrolidone (solvent), and 5 parts by weight of polyethylene hollow particles (particle size: 5 µm, volume percentage of hollow part: 50%, Mitsui Chemicals, Inc.) were added to prepare a positive electrode paint. The positive electrode paint was coated in a thickness of 0.15 mm on one side of a 0.02 mm thick aluminum foil (positive electrode current collector) with a doctor blade, and then dried at 100° C. in a hot-air drying oven. Similarly, on the opposite side of the aluminum foil, a positive electrode mixture layer was also formed.

Preparation of Positive Electrode Mixture Layer without Containing Resin Particles To 100 parts by weight of lithium cobaltate (positive electrode active material), 3 parts by weight of carbon black (electrical conduction enhancer), 3 parts by weight of poly (vinylidene fluoride) (binder), and 40 parts by weight of N-methyl-2-pyrrolidone (solvent) were added to prepare a positive electrode paint. The positive electrode paint was coated in a thickness of 0.15 mm on one side of a 0.02 mm thick aluminum foil (positive electrode current collector) with a doctor blade, and then dried at 100° C. in a hot-air drying oven. Similarly, on the opposite side of the aluminum foil, a positive electrode mixture layer was also formed.

Measurement of Surface Pore Area

Figure 4A:
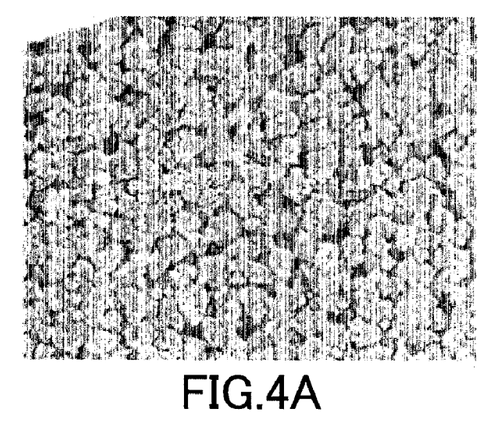
FIG. 4A is a picture showing a scanning electron microscope image of the surface of a positive electrode plate according to the present invention.
Figure 4B:
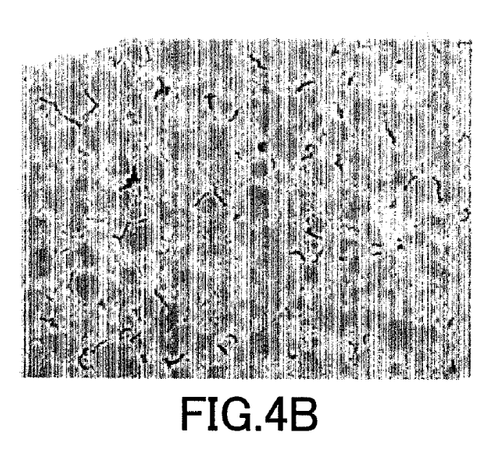
FIG. 4B is a picture showing a scanning electron microscope image of the surface of a positive electrode plate of a comparative embodiment.

A positive electrode plate (positive electrode plate according to the present invention) with the positive electrode mixture layer containing the resin particles and another positive electrode plate (positive electrode plate of Comparative Embodiment) with the positive electrode mixture layer without containing resin particles were each subjected to observation with a scanning electron microscope so as to take an image of its surface. FIG. 4A is a picture showing a scanning electron microscope image of the positive electrode plate surface of the present invention. FIG. 4B is a picture showing a scanning electron microscope image of the positive electrode plate surface of Comparative Embodiment. These pictures show that the positive electrode plate of the present invention has a larger number of unevenness and open pores as compared with the positive electrode plate of Comparative Embodiment.

Figure 4C:
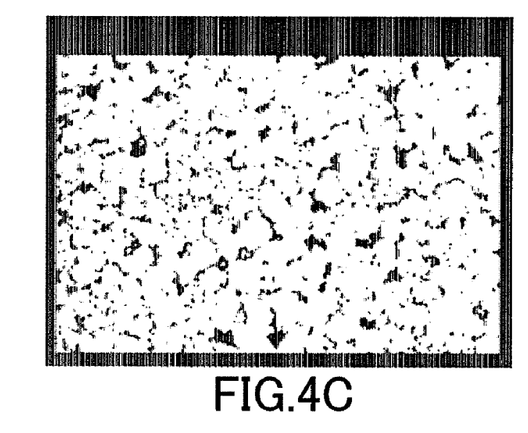
FIG. 4C shows a binarized image of the surface of a positive electrode plate of the present invention.
Figure 4D:
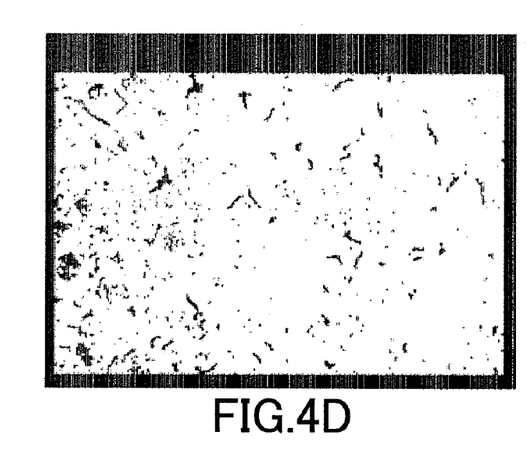
FIG. 4D shows a binarized image of the surface of a positive electrode plate of a comparative embodiment.

For these pictures, a certain field of view (area of the field of view: 300 µm×200 µm) was binarized, and the surface pore area in each field of view was evaluated. Specifically, the pictures of FIGS. 4A and 4B were reduced to 256 gray-scale images (0 to 255) and were binarized at a threshold of 70 (0 to 69 were reduced to 0 (black), and 70 to 255 were reduced to 255 (white)) by using IMAGE ANALYZER V10 for Windows (Toyobo Co., Ltd.). FIG. 4C is a picture of a binarized image showing the surface of the positive electrode plate according to the present invention. FIG. 4D is a picture of a binarized image showing the surface of the positive electrode plate of Comparative Embodiment. For each picture, the ratio (%) of the total area of black pixels to the total area of entire pixels was calculated and the resulting value was selected as a surface pore area for each field of view. As a result, the surface pore area of the positive electrode plate of the present invention was 12%, while the surface pore area of the positive electrode plate of Comparative Embodiment was only 6%.

This result shows that open holes can be formed in the positive electrode mixture layer by incorporating hollow resin particles in the positive electrode paint.

The rechargeable lithium ion battery according to the present invention has a large discharge capacity and is excellent in rate characteristics, so that it is useful as a battery for mobile use, for example. The production method according to the present invention can be applied not only to rechargeable lithium ion batteries but also to other energy storage devices such as solid state rechargeable lithium batteries and nickel metal hydride batteries.

What is claimed is:
1. A rechargeable lithium ion battery, comprising:
a positive electrode having a positive electrode mixture layer comprising a positive electrode active material and a binder resin;
a negative electrode having a negative electrode mixture layer comprising a negative electrode active material and a binder resin; and
a separator disposed between the positive electrode and the negative electrode, wherein
the positive electrode mixture layer further comprises 1 part by weight or more and 20 parts by weight or less of collapsed hollow resin particles with respect to 100 parts by weight of the positive electrode active material, and/or
the negative electrode mixture layer comprises 1 part by weight or more and 50 parts by weight or less of collapsed hollow resin particles with respect to 100 parts by weight of the negative electrode active material,
the collapsed hollow resin particles being collapsed product of hollow resin particles each having an empty space therein, and
when a scanning electron microscope image of the surface of the positive electrode mixture layer or the negative electrode mixture layer containing the collapsed hollow resin particles is reduced to a 256 gray-scale image and then is binarized into black pixels and white pixels at a threshold of 70, a ratio of the total area of the black pixels to the total area of entire pixels is 10% or more and 20% or less.

2. The rechargeable lithium ion battery according to claim 1, wherein
the collapsed hollow resin particles are contained in the positive electrode mixture layer or the negative electrode mixture layer at a resin particle density of 1 g/cm³ or more and 20 g/cm³ or less.

3. A method for producing a rechargeable lithium ion battery comprising the steps of:
forming a positive electrode having a positive electrode mixture layer and a positive electrode current collector by coating a positive electrode paint containing a positive electrode active material at a positive electrode active material density and a binder resin on the positive electrode current collector;
forming a negative electrode having a negative electrode mixture layer and a negative electrode current collector by coating a negative electrode paint containing a negative electrode active material at a negative electrode active material density and a binder resin on the negative electrode current collector;
increasing the positive electrode active material density in the positive electrode mixture layer by rolling the positive electrode;
increasing the negative electrode active material density in the negative electrode mixture layer by rolling the negative electrode; and
stacking in layers the positive electrode after rolling the positive electrode, a separator, and the negative electrode after rolling the negative electrode, wherein
the positive electrode paint further comprises 1 part by weight or more and 20 parts by weight or less of hollow resin particles each having an empty space therein with respect to 100 parts by weight of the positive electrode active material wherein the hollow resin particles have been collapsed with the rolling of the positive electrode, and/or
the negative electrode paint further comprises 1 part by weight or more and 50 parts by weight or less of hollow resin particles each having an empty space therein with respect to 100 parts by weight of the negative electrode active material wherein the hollow resin particles have been collapsed with the rolling of the negative electrode.

4. The method for producing a rechargeable lithium ion battery according to claim 3, wherein
the collapsed hollow resin particles are contained in the positive electrode mixture layer after rolling the positive electrode at a resin particle density of 1 g/cm³ or more and 20 g/cm³ or less or the negative electrode mixture layer after rolling the negative electrode at a resin particle density of 1 g/cm³ or more and 20 g/cm³ or less.

5. The method for producing a rechargeable lithium ion battery according to claim 3, wherein
an average diameter of the hollow resin particles contained in the positive electrode paint is 0.1 μm or more and 10 μm or less.

6. The method for producing a rechargeable lithium ion battery according to claim 3, wherein
an average diameter of the hollow resin particles contained in the negative electrode paint is 0.1 μm or more and 20 μm or less.

7. The method for producing a rechargeable lithium ion battery according to claim 3, wherein
the volume percentage of the empty space in the collapsed hollow resin particle is 20% or more and 80% or less.

* * * * *